Patented Nov. 14, 1944

2,362,761

UNITED STATES PATENT OFFICE 2,362,761

WATER-SOLUBLE CELLULOSE ETHER COMPOSITION

Robert C. Medl, Jr., Marshallton, Del., assignor to Hercules Powder Company, Wilmington, Del., a corporation of Delaware No Drawing. Application June 15, 1942,
Serial No. 447,176

8 Claims. (Cl. 106—182)

This invention relates to coating compositions and more particularly it relates to improved coating compositions based on water-soluble ethers of cellulose.

Water-soluble cellulose ethers are used as the essential ingredients in compositions useful for depositing grease-proof coatings. These ethers are also used for their effect in thickening water solutions used for coating purposes in paints, cosmetics, printing pastes and other uses.

Films from solutions of the water-soluble cellulose ethers have suffered from the disadvantages of separating from the surface to which they are applied. This disadvantage appears to be due to poor adhesiveness together with a tendency of the films to shrink and curl. In addition, the films are too hard or harsh for many purposes.

In accordance with this invention, these disadvantages are overcome by incorporating with the water-soluble cellulose ether dissolved in an aqueous medium, a water-soluble ester condensation product of a polyhydric alcohol and an inorganic polybasic acid. The ester condensation product serves to build up and to plasticize the film of the cellulose ether and to improve adhesion of the film.

Compositions in accordance with this invention are illustrated in the following examples of various specific embodiments. The examples of Table I are illustrative of coating compositions for various purposes. Examples 1-8 are suitable coating compositions for depositing grease-proof coatings on paper, cardboard, and the like. These solutions may be handled in iron equipment with substantially no discoloration.

*Table I*

|  | Example | | | | | | | |
|---|---|---|---|---|---|---|---|---|
|  | 1 | 2 | 3 | 4 | 5 | 6 | 7 | 8 |
| Ethylene glycol borate ("Aquaresin") | 2.5 |  |  | 1 |  |  | 1 |  |
| Glycol borate condensate |  |  | 1.5 |  |  | 2.5 |  |  |
| Glycol borate ("Bori-Borate") |  | 2.5 |  |  | 2 |  |  | 2 |
| Methyl cellulose | 5 | 5 |  |  |  | 5 | 3 | 5 |
| Cellulose ether of sodium glycollate |  |  |  | 4 |  |  |  |  |
| Water-soluble ethyl cellulose |  |  | 4 |  |  |  |  |  |
| Water-soluble hydroxy-ethylcellulose |  |  |  |  | 4 |  |  |  |
| Glycerol |  |  |  | 1 |  |  |  | 1 |
| Dextrose |  |  |  |  | 1 |  |  |  |
| Sodium caseinate |  |  | 1.5 |  |  |  | 1 | 1 |
| Water | 92.5 | 92.5 | 93 | 94 | 93 | 92.5 | 95 | 91 |

The compositions of Examples 1-8 were prepared by heating the water to 70° C., stirring in the cellulose ether and cooling the resulting mixture to 2° C. The resulting solution was then passed through a colloid mill. The other ingredients were then dissolved in the cellulose ether solution. The cellulose ethers used were of the low viscosity water-soluble type.

The compositions of Table II are coating compositions designed for substantially rigid surfaces. They are adapted for use on plaster or concrete surfaces, iron structural members, black iron sheets, and the like in locations not subject to the direct action of water.

*Table II*

|  | Example | | | | |
|---|---|---|---|---|---|
|  | 9 | 10 | 11 | 12 | 13 |
| Methyl cellulose | 6 | 5 | 5 | 3 | 5 |
| Glycerol borate ("Aquaresin GB") | 2 | 1 | 2.5 | 1 | 2 |
| Sodium tetraborate | 0.5 | 0.4 |  | 0.5 | 0.5 |
| Whiting | 1 |  |  |  | 1 |
| Asbestine | 0.5 | 0.2 |  |  |  |
| Zinc oxide |  | 1.4 |  |  | 1 |
| Sodium caseinate | 2 | 1 |  | 1 | 2.5 |
| Water | 78 | 81 | 92.5 | 94.5 | 88 |
| Ethyl alcohol | 10 | 10 |  |  |  |

The compositions according to Table II were prepared in the same manner as those described in Table I. The pigment was thoroughly stirred into the solution in each case and permitted to settle for five minutes. The resulting suspension was then decanted from any coarse material settling out during this period.

Although the modification of water-soluble cellulose ethers with esters of organic polyhydric alcohols and inorganic tribasic acids finds its chief application in coating compositions, such modification is also useful in cellulose ether compositions intended for other purposes, for example, in the preparation of printing pastes, lotions, wave set compositions, and the like. Compositions of the esters and the water-soluble cellulose ethers intended for use as adhesives are illustrated by the following:

*Table III*

|  | Example | | | |
|---|---|---|---|---|
|  | 14 | 15 | 16 | 17 |
| Glycol borate ("Aquaresin") | 1 | 2 | 1 | 1 |
| Cellulose ether of sodium glycollate | 2 |  |  | 1 |
| Methyl cellulose |  | 6 | 4 | 3 |
| Sodium caseinate |  | 2 | 1 |  |
| Sodium tetraborate |  | 0.4 |  |  |
| Phenol |  | 0.1 | 0.1 |  |
| Water | 97 | 81.5 | 85.9 | 96 |
| Acetone |  | 8 | 8 |  |

The compositions in accordance with this invention will in most cases contain methyl cellulose as the water-soluble cellulose ether since it is the most available of this group. However, water-soluble cellulose ethers of glycollic acid or glycollic salts such as the ammonium, sodium and potassium salts have been found equally suitable as have water-soluble ethyl cellulose and water-soluble hydroxyethyl cellulose. Lower alkyl ethers of cellulose, with substituted or unsubstituted alkyl groups, are in general suitable if the cellulose substitution is in the water-soluble range. High viscosity types of the cellulose ethers are usually utilized where the primary purpose of the ether is to thicken. Where the primary purpose is to deposit a fairly heavy film, low viscosity types are utilized.

The organic borates illustrated in the examples are illustrative of borate esters found suitable. In general, condensate esters of ethylene glycol, diethylene glycol, triethylene glycol, glycerol, diglycerol, erythritol, pentaerythritol, dipentaerythritol, mannitol, sorbitol and the like with boric acid are suitable. Preferably, free hydroxyl groups are present in the condensate. The esters are condensates of varying degree of complexity and in most cases display resinous or vitreous properties and form viscous solutions. They are available under the trade names of "Glyceryl Bori-Borate," "Glycol Bori-Borate," "Aquaresin," "Aquaresin GB," and "Aquaresin GM." Corresponding stable water-soluble esters of other tribasic acids, for example, phosphoric acid and arsenic acid, are likewise suitable. The esters utilized are in all cases substantially stable and without appreciable degrading influence or otherwise destructive of the cellulose ethers. This is also true in the presence of moisture or in water solutions. It will be appreciated that the terms "boric acid" and "phosphoric acid" are herein and in the claims inclusive of the various phosphoric and boric acids.

The organic esters which have been mentioned serve as plasticizers which improve the flexibility of films deposited from solutions and which have the effect of making the films conform well permanently to the surface upon which they are deposited. The films obtained upon drying of the composition solvent are at first quite soft, hardening and increasing in toughness for several days. The films are permanently flexible. However, where additional flexibility or softness is desired, known plasticizers for the water-soluble cellulose ethers, for example, glycerol, ethylene glycol, diacetin, and the like, may be added. In general, the quantity of plasticizer and polyhydric alcohol organic esters will total no more than the weight of the cellulose ether.

Various sugars, such as, dextrose, glucose, levulose, and the like may be included in the compositions. They serve to harden the film. Various film building water-soluble materials may also be included. Such substances are, for example, sodium silicate, gelatin, gum tragacanth, gum arabic and soluble casein. They may be used in a quantity up to about that of the cellulose ether. Soluble fillers, pigments and soluble color matter may also be included.

In compositions in accordance with this invention, the polyhydric alcohol-inorganic tribasic acid esters will be utilized in a quantity between about 5% and about 100% by weight of the cellulose ether present. In compositions intended to deposit grease-proof coatings, the quantity utilized will preferably be between about 10% and about 40% by weight of the cellulose ether. Aqueous compositions will vary considerably in their content of the water-soluble cellulose ethers. Where the ether is used primarily for thickening, it will usually be in a quantity between about 0.3 and about 5% of the solution. Where the ether is used for depositing a film, it will usually be used in a quantity between about 1% and about 20% by weight of the solution.

The compositions in accordance with this invention have the advantage of being less subject to discoloration upon contact with iron surfaces than similar films not containing the esters. Thus, black iron or clean iron sheets may be coated therewith with decreased or no formation of rust spots before and during drying of the film. Addition of a small amount of borax completely eliminates rusting tendencies which may remain. The flexibility of cellulose ether films is improved by the addition of the esters mentioned and the films conform more exactly to the surface on which they are cast, leading to better overall adhesion.

What I claim and desire to protect by Letters Patent is:

1. A composition comprising a water-soluble cellulose ether and a complex ester condensation product of a polyhydric alcohol with a boric acid, said product being water-soluble and stable in water solution, as a modifier to plasticize and improve adhesion of films of the cellulose ether in a quantity between about 5% and about 100% of the cellulose ether by weight.

2. A coating composition comprising essentially a water-soluble cellulose ether and a complex ester condensation product of a polyhydric alcohol and an inorganic polybasic acid which is water-soluble and stable in water solution, the said ester condensation product being in a quantity between about 5% and about 100% by weight of the water-soluble ether and serving to improve the flexibility of the ether, said ether and condensation product being in solution in water and the ether being in a quantity between about 1% and about 20% by weight of the solution.

3. A coating composition comprising essentially a water-soluble cellulose ether and a complex ester condensation product of a polyhydric alcohol with a boric acid in water solution, said condensation product being water-soluble and stable in water solution and being in a quantity between about 5% and about 100% by weight of the ether to plasticize and improve adhesion of the cellulose ether, said ether being in quantity between about 1% and about 20% by weight of the solution.

4. A coating composition comprising essentially a water-soluble methyl cellulose and a complex ester condensation product of a polyhydric alcohol with a boric acid in water solution, said condensation product being water-soluble and stable in water solution and being in a quantity between about 5% and about 100% by weight of the methyl cellulose to serve as a plasticizer therefor, and said methyl cellulose being in a quantity between about 1% and about 20% by weight of the solution.

5. A coating composition comprising essentially a water-soluble glycolic cellulose ether and a complex ester condensation product of a polyhydric alcohol with a boric acid in aqueous solution, said condensation product being water-soluble and stable in water solution and being in a quantity between about 5% and about 100% by weight of the ether to serve as a plasticizer therefor, said ether being in a quantity between about 1% and about 20% by weight of the solution.

6. A coating composition comprising essentially a water-soluble glycolic acid cellulose ether and a glycol borate in aqueous solution, the said borate being a complex ester condensation product soluble in water and stable in water solution, and serving as a modifier to plasticize and improve adhesion of coatings of the cellulose ether and being present in a quantity between about 5% and about 100% by weight of the ether, said ether being in a quantity between about 1% and about 20% by weight of the solution.

7. A coating composition comprising essentially a water-soluble methyl cellulose and a glycerol borate in aqueous solution, the said borate being a complex ester condensation product soluble in water and stable in water solution, and serving as a modifier to plasticize and improve adhesion of coatings of the cellulose ether and being present in a quantity between about 5% and about 100% by weight of the ether, said ether being in a quantity between about 1% and about 20% by weight of the solution.

8. A coating composition comprising essentially a water-soluble glycolic acid cellulose ether and a glycerol borate in aqueous solution, the said borate being a complex ester condensation product soluble in water and stable in water solution, and serving as a modifier to plasticize and improve adhesion of coatings of the cellulose ether and being present in a quantity between about 5% and about 100% by weight of the ether, said ether being in a quantity between about 1% and about 20% by weight of the solution.

ROBERT C. MEDL, JR.